United States Patent
Goutal et al.

(10) Patent No.: US 10,673,896 B2
(45) Date of Patent: Jun. 2, 2020

(54) DEVICES, SYSTEMS AND COMPUTER-IMPLEMENTED METHODS FOR PREVENTING PASSWORD LEAKAGE IN PHISHING ATTACKS

(71) Applicant: Vade Secure Inc., San Francisco, CA (US)

(72) Inventors: Sebastien Goutal, San Francisco, CA (US); Antoine Honore, Templemars (FR)

(73) Assignee: VADE SECURE INC., San Francisco, CA (US)

(*) Notice: Subject to any disclaimer, the term of this patent is extended or adjusted under 35 U.S.C. 154(b) by 0 days.

(21) Appl. No.: 16/372,269

(22) Filed: Apr. 1, 2019

(65) Prior Publication Data
US 2019/0327268 A1    Oct. 24, 2019

Related U.S. Application Data

(63) Continuation of application No. 15/607,329, filed on May 26, 2017, now Pat. No. 10,356,125.

(51) Int. Cl.
*H04L 29/06* (2006.01)
*G06F 21/62* (2013.01)
*H04L 9/32* (2006.01)

(52) U.S. Cl.
CPC ...... *H04L 63/1483* (2013.01); *G06F 21/6245* (2013.01); *G06F 21/6263* (2013.01);
(Continued)

(58) Field of Classification Search
CPC ........................... H04L 63/1483; H04L 9/3236
(Continued)

(56) References Cited

U.S. PATENT DOCUMENTS 7,461,339 B2 ‡ 12/2008 Liao ..................... G06F 17/2264
715/23
7,802,298 B1 ‡ 9/2010 Hong ..................... G06F 21/51
705/51
(Continued)

OTHER PUBLICATIONS

R. Verma, N. Shashidhar and N. Hossain—Detecting Phishing Emails the Natural Language Way—2012, downloaded April.‡
(Continued)

*Primary Examiner* — Longbit Chai
(74) *Attorney, Agent, or Firm* — Young Law Firm, P.C.

(57) ABSTRACT

A computer-implemented method of preventing leakage of user credentials to phishing websites may comprise capturing user credentials input to website; updating a stored list of trusted website credentials upon determining that the domain of the URL of the website is present in a stored list of trusted websites; generating a hash of the captured user credentials; determining whether the hashed user credentials matches one of the hashed user credentials in the list of trusted website credentials; and when a match is found, requesting input whether the website is trusted or whether the website is unknown and/or untrusted; sending the URL to a remote computer server when the input indicates that the website is unknown and/or untrusted and disallowing submission of the user credentials to the website; adding the domain of the URL to the stored list of trusted websites, adding the generated hash of the captured user credentials to a stored list of trusted website credentials and allowing submission of the user credentials to the website.

20 Claims, 5 Drawing Sheets

(52) U.S. Cl.
CPC .......... *H04L 9/3236* (2013.01); *H04L 9/3239* (2013.01); *H04L 63/06* (2013.01); *H04L 63/083* (2013.01); *H04L 63/101* (2013.01); *G06F 2221/2119* (2013.01)

(58) Field of Classification Search
USPC .......................................................... 713/168
See application file for complete search history.

(56) References Cited

U.S. PATENT DOCUMENTS

| | | | | |
|---|---|---|---|---|
| 8,019,995 | B2 ‡ | 9/2011 | van Bemmel | G06F 21/31 713/16 |
| 8,095,967 | B2 * | 1/2012 | Loesch | G06F 21/606 726/5 |
| 8,433,914 | B1 ‡ | 4/2013 | Philpott | H04L 9/3247 713/17 |
| 8,578,499 | B1 ‡ | 11/2013 | Zhu | G06F 21/567 713/15 |
| 8,621,614 | B2 ‡ | 12/2013 | Vaithilingam | G06Q 10/107 713/15 |
| 8,745,151 | B2 ‡ | 6/2014 | Rowley | G06F 21/6209 709/21 |
| 9,027,126 | B2 ‡ | 5/2015 | Larkins | G06F 21/554 713/18 |
| 9,071,600 | B2 ‡ | 6/2015 | Alagha | H04L 63/0272 |
| 9,111,090 | B2 ‡ | 8/2015 | Klein | G06F 21/552 |
| 2006/0101334 | A1 ‡ | 5/2006 | Liao | G06F 17/2264 715/20 |
| 2006/0168066 | A1 ‡ | 7/2006 | Helsper | G06Q 10/107 709/20 |
| 2007/0055749 | A1 ‡ | 3/2007 | Chien | G06F 21/645 709/21 |
| 2007/0136806 | A1 * | 6/2007 | Berman | G06Q 10/107 726/22 |
| 2007/0245422 | A1 ‡ | 10/2007 | Hwang | G06F 21/31 726/26 |
| 2008/0028444 | A1 ‡ | 1/2008 | Loesch | G06F 21/606 726/4 |
| 2008/0046738 | A1 ‡ | 2/2008 | Galloway | H04L 63/1416 713/17 |
| 2008/0115214 | A1 ‡ | 5/2008 | Rowley | G06F 21/31 726/22 |
| 2009/0006861 | A1 ‡ | 1/2009 | Bemmel | G06F 21/31 713/18 |
| 2009/0328208 | A1 ‡ | 12/2009 | Peters | G06F 21/51 726/22 |
| 2010/0050243 | A1 ‡ | 2/2010 | Hardt | H04L 63/0823 726/6 |
| 2010/0306845 | A1 ‡ | 12/2010 | Vaithilingam | G06Q 10/107 726/23 |
| 2011/0072262 | A1 ‡ | 3/2011 | Amir | G06F 21/52 713/16 |
| 2011/0247045 | A1 ‡ | 10/2011 | Rajagopal | H04L 63/08 726/1 |
| 2012/0324568 | A1 ‡ | 12/2012 | Wyatt | G06F 21/51 726/13 |
| 2013/0254530 | A1 ‡ | 9/2013 | Amir | G06F 21/52 713/15 |
| 2013/0254888 | A1 ‡ | 9/2013 | Amir | G06F 21/52 762/23 |
| 2013/0263264 | A1 ‡ | 10/2013 | Klein | G06F 21/552 726/23 |
| 2014/0041024 | A1 ‡ | 2/2014 | Larkins | G06F 21/554 726/22 |
| 2014/0165177 | A1 ‡ | 6/2014 | Alagha | H04L 63/0272 726/9 |
| 2015/0052005 | A1 ‡ | 2/2015 | Howe | G06Q 20/40 705/26 |
| 2015/0365433 | A1 ‡ | 12/2015 | Klein | G06F 21/552 726/23 |

OTHER PUBLICATIONS

A. A. Akinyelu and A. O. Adewumi—Classifaction of Phishing Email Using Random Forest Machine Learning, downloaded Apr. 10, 2017 Technique—2014.‡
M. Chandrasekaran, K. Narayanan, S. Upadhyaya—Phishing email detection based on structural properties—2006, downloaded Apr. 10, 2017.‡
A. Mosquera, L. M. Aouad, S. Grzonkowski and D. Morss—On Detecting Messaging Abuse in Short Text Messages using Linguistic and Behavioral patterns—2014, downloaded Apr. 10, 2017.‡
M. S. Qaseem and A. Govardhan—Phishing Detection in IMs using Domain Ontology and CBA—An Innovative Rule Generation Approach—2014, downloaded Apr. 10, 2017.‡
C. Whittaker, B. Ryner and M. Nazif—Large-Scale Automatic Classification of Phishing Pages—2010, downloaded Apr. 10, 2017.‡
Y. Zhang, J. I. Hong, and L. F. Cranor. CANTINA: A Content-Based Approach to Detecting Phishing Web Sites—2007, downloaded Apr. 10, 2017.‡
R. S. Rao and S. T. Ali—PhishShield: A Desktop Application to Detect Phishing Webpages through Heuristic Approach—2015, downloaded Apr. 10, 2017.‡
Afroz and R. Greenstadt—PhishZoo: An Automated Web Phishing Detection Approach Based on Profiling and Fuzzy Matching—2009, downloaded Apr. 10, 2017.‡
DOM—https://www.w3.org/DOM/, downloaded Apr. 10, 2017.‡
UI Events—https://www.w3.org/TR/uievents/, downloaded Apr. 10, 2017.‡
Wikipedia—https://en.wikipedia.org/wiki/Keystretching, downloaded Apr. 10, 2017.‡
B. Kaliski—PKCS #5: Password-Based Cryptography Specification Version 2.0—2000, downloaded Apr. 10, 2017.‡
N. Provos and D. Mazieres—A Future-Adaptable Password Scheme—1999, downloaded Apr. 10, 2017.‡
C. Percival and S. Josefsson—The scrypt Password-Based Key Derivation Function—2016, downloaded Apr. 10, 201.‡
A. Biryukov, D. Dinu and D. Khovratovich—Argon2: the memory-hard function for password hashing and other applications—2015, downloaded Apr. 10, 2017.‡
Wikipedia—https://en.wikipedia.org/wiki/Salt_(cryptography), downloaded Apr. 10, 2017.‡
Forms—https://www.w3.org/TR/html4/interact/forms.htm, downloaded May 9, 2017.‡
Mutation Observers—https://www.w3.org/TR/dom/#mutation-observers, downloaded May 9, 2017.‡

\* cited by examiner
‡ imported from a related application

DEVICES, SYSTEMS AND COMPUTER-IMPLEMENTED METHODS FOR PREVENTING PASSWORD LEAKAGE IN PHISHING ATTACKS

CROSS-REFERENCE TO RELATED APPLICATIONS

This application is a continuation of and claims priority under 35 USC § 120 to co-pending and commonly-assigned U.S. patent application Ser. No. 15/607,329 filed on May 26, 2017, entitled "DEVICES, SYSTEMS AND COMPUTER-IMPLEMENTED METHODS FOR PREVENTING PASSWORD LEAKAGE IN PHISHING ATTACKS", which application is incorporated herein by reference in its entirety.

BACKGROUND

Phishing is the attempt to acquire sensitive data—such as credit card numbers, login credentials, social security numbers—for malicious reasons by masquerading as a trustworthy entity in an electronic communication such as email or text message. Such trustworthy entities may include banks (Chase, HSBC . . . ), online payment services (PayPal . . . ), email service providers (Gmail, Yahoo!, British Telecom, T-Online . . . ), social networks (Facebook, LinkedIn . . . ) and e-commerce websites (Amazon, Alibaba . . . ), to name but a few.

The phishing scam takes place in several consecutive steps. Herein, the worst-case scenario is assumed, in that the victim is trapped by the phishing scam. The sequence of events leading to this bad outcome may include the following:

1. The phisher sets up a counterfeited website. This counterfeited website mimics a selected, well-known and legitimate website. This counterfeited website is configured to capture sensitive data of the victims.

2. The phisher initiates a phishing campaign by a chosen electronic communication modality (email, text message, instant messaging, etc.). The phishing message contain a message designed to prompt the victim to click on a fraudulent Uniform Resource Locator (URL), which leads the victim to the counterfeited website.

3. The victim receives the phishing message and clicks on the fraudulent URL. The victim's browser opens the counterfeited website and the victim submits the requested sensitive data to the counterfeited website, thinking that it is the legitimate website that it mimics.

4. The fraudulent website forwards the submitted and captured sensitive data to the phisher, typically to a mailbox previously set up by the phisher to receive such captured sensitive data.

To thwart phishing attacks, the industry, including security vendors, web browser vendors, internet service providers, email service providers, wireless communications service providers, has developed different technologies. Most of these technologies can be classified in two categories:

Electronic communication (email, text message, instant messaging, etc.) related technologies: these technologies attempt to detect phishing attacks by analyzing the inbound and/or outbound electronic communication traffic. Various methods are used to detect the phishing attacks, such as anti-phishing email filtering technologies used by email service providers (Gmail, Yahoo!, AOL, AT&T, Comcast, British Telecom, Vodafone, Orange and the like) to protect their customers. These email service providers develop their own technologies and/or use existing technologies provided by email security vendors such as Spamhaus, Cloudmark, Cyren or Vade Secure.

Web-related technologies, which attempt to detect phishing webpages by analyzing the webpage itself. Typical of such approach are anti-phishing technologies available in web browsers, such as Google Safe Browsing for Google Chrome or SmartScreen for Microsoft Edge.

In most cases, a phishing attack is an attempt to capture login credentials (often, login and password) inputted by the user as he or she tries to connect to what is believed to be a trusted website. The fact that the end user submits such sensitive data as a password in an unknown context is highly suspicious. The phishing problem relies on the user's inattention and the casualness with which most users provide their credentials upon demand. Rather than attempting to change the user's behavior, what is needed is a technological solution to the technological problem of bad actors setting up fraudulent websites to prey on their victims. Such a technological solution should leverage the user's own computing device and its connection to computer networks such as the Internet, to address and thwart efforts to steal confidential user credentials.

DETAILED DESCRIPTION

Figure 1:
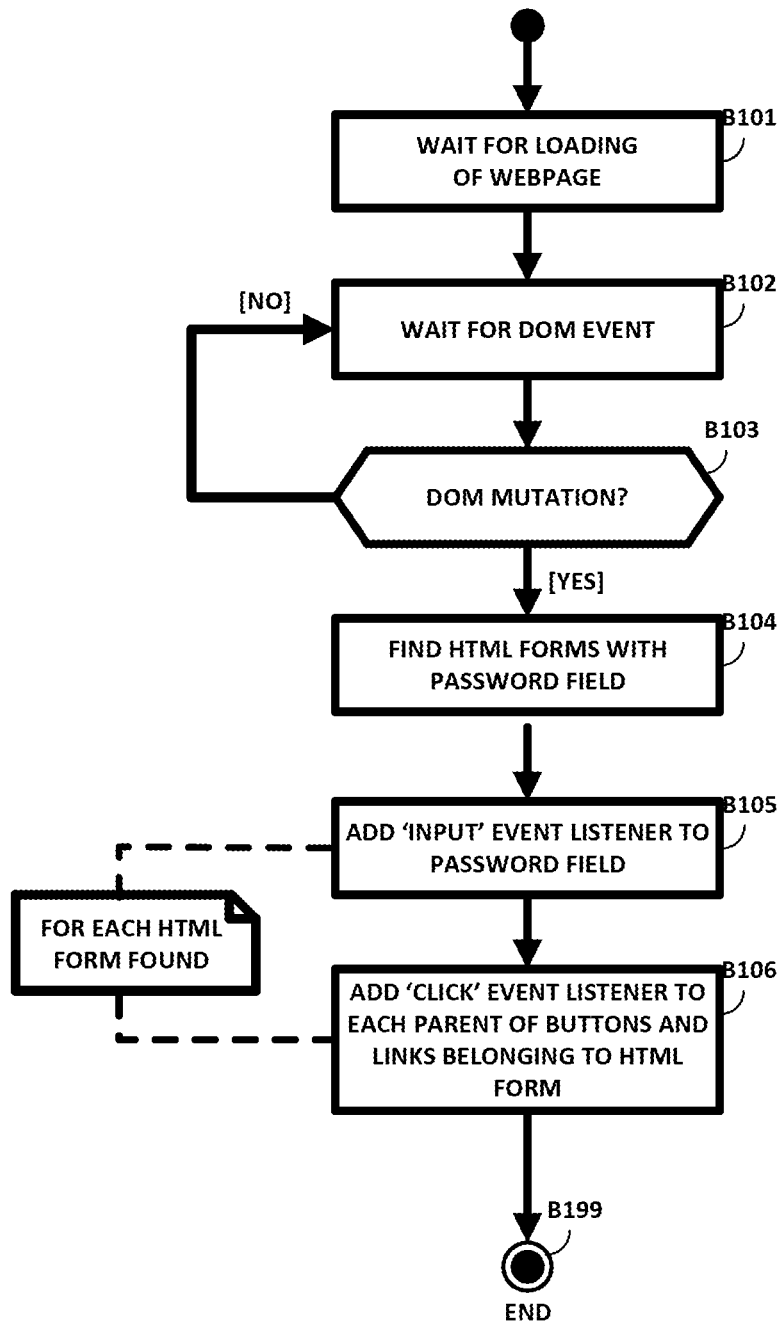
FIG. 1 is a flowchart of aspects of a computer-implemented method, according to one embodiment.

One embodiment is a technology-based solution to the password (and, more generally, user credential) leakage problem that enables thwarting phishing attacks through the detection and interception of password leakage. In one implementation, a computing device may be provided with a software component that utilizes and/or controls both local and remote hardware resources to thwart phishing attacks by detecting, intercepting and preventing password leakage, which may include phishers obtaining user credentials under false pretenses.

Deployment

According to one embodiment, a software component, according to one embodiment, may be deployed to connect to a unique centralized service in the cloud (i.e., a centralized service running on one or more remote (e.g., hardware) computer servers and configured to access remote storage memory over a computer network.

According to one embodiment, the remote computer servers providing the centralized service may be configured to create, store and update a list of trusted websites. The centralized service/remote server(s) may be also configured to collect phishing URLs detected by the software component according to one embodiment and confirmed by the end user, thereby keeping pace with phishers as they evolve and develop new counterfeited websites.

Trusted Websites

A trusted website may be thought of as a website that has a very good reputation and that belongs to a trusted entity. These entities are typically brands of goods and/or services that are targeted by phishing attacks. A trusted website, according to one embodiment, may be identified by its domain name. Examples of trusted websites include, to identify but a few:

- Major banks and online payment services such as paypal.com, chase.com, hsbc.com;
- Major email service providers such as yahoo.com, aol.com, orange.fr;
- Major social networks such as facebook.com and linkedin.com; and
- Major electronic commerce websites such as amazon.com, amazon.co.uk, alibaba.com.

According to one embodiment, a list of trusted websites called TRUSTED_WEBSITES may be created, stored in non-volatile physical memory and maintained. In one implementation, the TRUSTED_WEBSITES list may be stored and/or managed by the computing device running the password leakage preventing software component according to one embodiment. This list, according to one embodiment, may be updated periodically, by the centralized service over a computer network (including, for example, the Internet) according to one embodiment, to follow the natural evolution of the Internet ecosystem. For example, if a new major social network or banking website is created, its domain name may be added to TRUSTED_WEBSITES list.

For example, a TRUSTED_WEBSITES list, according to one embodiment, may include one or more of the following domain names (or may include entirely others): alibaba.com; amazon.co.uk; amazon.com; aol.com; chase.com; facebook.com; hsbc.com; linkedin.com; orange.fr; paypal.com; yahoo.com.

The TRUSTED_WEBSITES list, in one embodiment, may also be updated when a computing device running the password leakage preventing software component according to one embodiment receives input (e.g., from a user or other programmatic source) that is indicative that a website is legitimate and should be trusted. For example, if the computing device running the password leakage preventing software component receives input that indicates that ucwv.edu (the University of Charleston website) is legitimate and should be trusted, the present software component may then add the ucwv.edu domain name to the TRUSTED_WEBSITES list. Within the present context and according to one embodiment, an unknown website is a website whose domain name is not included in the TRUSTED_WEBSITES list.

Password Capture

Embodiments include a computing device and a computer-implemented method that are configured to:

- capture every password submitted by the end user;
- analyze the password and, based on the results of the analysis, either generate and show a warning page or allow the login credentials to be sent to the website. In one embodiment, this computer-implemented method may be carried out at least in part by a password leakage preventing component according to one embodiment, on a computing device, such as a desktop computer, a laptop computer, a mobile device, a digital assistant (such as Amazon's Echo and Google's Google Home).

In a typical website login process, an end user fills in the fields required to login by, for example, typing, speaking, selecting pre-populated input fields to populate the input fields with his or her credentials. Most often, the credentials may include an identifier and a password, or the functional equivalents thereof. These credentials may then be submitted to the website by the computing device, responsive to receiving input representative of the user having clicked a button, pressed the Enter/Return key or having carried out a functionally equivalent positive action. In one embodiment, the login credentials may be stored as HyperText Markup Language (HTML) input tags within a HTML form. The login credentials may be stored differently in other embodiments, as implementations of the present embodiments are not limited to HTML or derivatives thereof. The password field can be easily identified because the type of the HTML input tag is usually "password". When the HTML form is submitted, the login credentials may be encoded and transmitted to the website in a HyperText transfer protocol (HTTP) request using POST or GET method—according to the action and method attributes defined in the HTML form.

Below is an example of a login HTML form:

```
<form name="login" action="submit" method="get" accept-charset="utf-8">
    <ul>
        <li><label for="usermail">Email</label>
        <input type="email" name="usermail" placeholder="yourname@email.com" required></li>
        <li><label for="password">Password</label>
        <input type="password" name="password" placeholder="password" required></li>
        <li>
        <input type="submit" value="Login"></li>
    </ul>
</form>
```

There are different ways to capture user credentials, and any may be used herein.

Described hereunder relative to FIG. 1 is one embodiment, implemented as a software component. Such a software component may be configured as a standalone component or may be configured to add features and functionality to a web browser. In one embodiment, as shown at B101, the present password leakage preventing component waits for the processor(s) of the computing device to load the requested webpage and for all its resources to be loaded and stored in memory. This may occur when the Document Object Model (DOM) tree reaches an idle state. Other indicators of completion of the loading of the website and of its associated resources may also be used within the present context. Then, the password leakage preventing component waits for DOM events, as shown at B102. HTML DOM events allow JavaScript to register different event handlers on elements in an HTML document. Events are normally used in combination with functions, and the function will not be executed before the event occurs (such as when a user clicks a button). As shown at B103, if a DOM mutation occurs (mutation events provide a mechanism for a web page or an extension to be notified of changes made to the DOM), then the present password leakage preventing component proceeds to the next step at B104 through the [Yes] branch. If a DOM mutation has not occurred, then present computer-implemented method reverts to B102 and waits for DOM events. If a DOM mutation has occurred, the present password leakage preventing component proceeds to B104, to search the DOM tree for all HTML forms that contain a password field such as, for example, all HTML forms that include an input tag of the "password" type.

For every HTML form found, the password leakage preventing software component, according to one embodiment, may add input event listeners as shown at B105 to capture specific events (such as mouse clicks, touch events, and the like). Indeed, an input event listener may be added for the password field, so the present password leakage preventing software component may capture any change to the password field. Alternatively, or in addition, a click event listener may be added as shown at B106 for buttons and links within the form so that the password leakage preventing software component may capture a password field submission following receipt of input that is indicative of a significant end user action such as a click on a button, a click on a link and/or an Enter/Return key press. As shown in FIGS. 1, B105 and B106 may be carried out, according to one embodiment, for each HTML form found.

Password Storage

According to one embodiment, the list of passwords may be stored in TRUSTED_WEBSITES_PASSWORDS data structure, stored on a non-volatile physical memory store such as, for example, a solid-state memory and/or one or more hard disk drives. Each of the passwords stored in the TRUSTED_WEBSITES_PASSWORDS data structure is associated with a trusted website. In one embodiment, for each trusted website, the present password leakage preventing component may store at most a maximum number of passwords stored in TRUSTED_WEBSITES_PASS-WORDS_MAX (default, but selectable value: 3) and may implement, for each trusted website, First In, First Out (FIFO) strategy, such that the oldest password stored is the first deleted as new passwords are captured and stored in the data structure. Even if there is only one valid password for a trusted website, more than one password may be stored, as there are several use cases in which a connection is attempted to a trusted website with an invalid (e.g., mistyped) password. Examples of such use cases include the case in which the end user makes a mistake while typing the password, the case in which the Caps Lock key is pressed while the end user is typing the password or the case in which, for example, the end user has forgotten the password for the website.

In one embodiment, the password may be stored as a hash. In one implementation, the passwords may be stored in persistent memory (e.g., on flash memory and/or on a hard disk drive or other non-volatile memory of a computing device) as a hash produced by, according to one embodiment, a key-stretching algorithm. Such a key-stretching algorithm makes a possibly weak key, typically a password or passphrase, more secure against a brute force attack by increasing the time it takes to test each possible key. Indeed, passwords or passphrases created by humans are often short or predictable enough to allow password cracking. Key-stretching makes such attacks more difficult. In one implementation, the key-stretching algorithm may be PBKDF2, for example. Other key stretching algorithms could be used as well, such as bcrypt, scrypt or Argon2, for example. According to one embodiment, a cryptographic salt may be generated by the present password leakage preventing software component after its installation. The cryptographic salt may use random data that functions as an additional input to the (e.g., one-way) function that hashes the passwords, to render the hashed, encrypted passwords more resistant to, for example, pre-computed rainbow table attacks against hashed values.

Example of Password Storage

In this implementation example, end user John Smith has installed the present password leakage preventing software component in the computing device with which he accesses websites. In this example, the TRUSTED_WEBSITES_PASSWORDS_MAX=2. Moreover, the key-stretching algorithm used to hash the passwords is the PBKDF2 algorithm with 1,000 iterations. The cryptographic salt used in this example is, in hexadecimal notation, 085A4FD-BA2732B44427AD47668C63DBF. John Smith connects successfully to facebook.com by submitting his password alpha1982 on Jan. 12, 2017 at 8:41:12 am. In this case, the password leakage preventing software component will update TRUSTED_WEBSITES_PASSWORDS with the following data.

| trusted website domain | hashed password (base-64) | submission date |
|---|---|---|
| facebook.com | rY35B19Qxfsic2RVLoaL1d/oSmlsWc+Ap0/VwX4XcHs= | Jan. 12, 2017 8:41:12 AM |

John Smith then connects to linkedIn.com on Jan. 14, 2017 at 6:56:09 PM with the same password; namely, alpha1982. The password leakage preventing software component will update the TRUSTED_WEBSITES_PASSWORDS data structure with the following data.

| trusted website domain | hashed password (base-64) | submission date |
|---|---|---|
| facebook.com | rY35B19Qxfsic2RVLoaL1d/oSmlsWc+Ap0/VwX4XcHs= | Jan. 12, 2017 8:41:12 AM |
| linkedin.com | rY35B19Qxfsic2RVLoaL1d/oSmlsWc+Ap0/VwX4XcHs= | Jan. 14, 2017 6:56:09 PM |

However, this password (alpha1982), submitted to LinkedIn.com, is invalid. He tries again at 6:56:27 PM with alpha1982linkedin—which is the correct password. The password leakage preventing software component then updates TRUSTED_WEBSITES_PASSWORDS with the following data:

| trusted website domain | hashed password (base-64) | submission date |
|---|---|---|
| facebook.com | rY35B19Qxfsic2RVLoaL1d/oSmlsWc+Ap0/VwX4XcHs= | Jan. 12, 2017 8:41:12 AM |
| linkedin.com | rY35B19Qxfsic2RVLoaL1d/oSmlsWc+Ap0/VwX4XcHs= | Jan. 14, 2017 6:56:09 PM |
| linkedin.com | zPI/9Rf+/j7Yu2gKJirU8bXA83d/Gx5xTBWzFYa3XgU= | Jan. 14, 2017 6:56:27 PM |

Several days later, John Smith tries to connect to paypal.com with alpha1982. The password leakage preventing component may update TRUSTED_WEBSITES_PASSWORDS with the following data.

| trusted website domain | hashed password (base-64) | submission date |
| --- | --- | --- |
| facebook.com | rY35B19Qxfsic2RVLoaL1d/oSmlsWc+Ap0/VwX4XcHs= | Jan. 12, 2017 8:41:12 AM |
| linkedin.com | rY35B19Qxfsic2RVLoaL1d/oSmlsWc+Ap0/VwX4XcHs= | Jan. 14, 2017 6:56:09 PM |
| linkedin.com | zPI/9Rf+/j7Yu2gKJirU8bXA83d/Gx5xTBWzFYa3XgU= | Jan. 14, 2017 6:56:27 PM |
| paypal.com | rY35B19Qxfsic2RVLoaL1d/oSmlsWc+Ap0/VwX4XcHs= | Jan. 17, 2017 8:57:30 PM |

However, the alpha1982 password submitted to paypal.com is incorrect. Notice that the hash entered for the password submitted for paypal.com is the same as the hash generated for the password previously submitted to facebook.com, as well as the hash for the (incorrect) password submitted to LinkedIn.com. This is because the same key-stretching algorithm and the same cryptographic salt were used. John Smith later tries again with alpha1982papyal—note the miss-spelling of the "papyal" portion of the password. The present password leakage preventing component will, therefore, update the TRUSTED_WEBSITES_PASSWORDS data structure with the following data:

| trusted website domain | hashed password (base-64) | submission date |
| --- | --- | --- |
| facebook.com | rY35B19Qxfsic2RVLoaL1d/oSmlsWc+Ap0/VwX4XcHs= | Jan. 12, 2017 8:41:12 AM |
| linkedin.com | rY35B19Qxfsic2RVLoaL1d/oSmlsWc+Ap0/VwX4XcHs= | Jan. 14, 2017 6:56:09 PM |
| linkedin.com | zPI/9Rf+/j7Yu2gKJirU8bXA83d/Gx5xTBWzFYa3XgU= | Jan. 14, 2017 6:56:27 PM |
| paypal.com | rY35B19Qxfsic2RVLoaL1d/oSmlsWc+Ap0/VwX4XcHs= | Jan. 17, 2017 8:57:30 PM |
| paypal.com | S43MVs5yRv/hUha6qQBjhbafu/1QQDqbTL9W3ipED3E= | Jan. 17, 2017 8:57:40 PM |

The password is still incorrect. Finally, John Smith tries again with alpha1982paypal—note the spelling of the "paypal" portion of the password—and finally connects successfully to his account at paypal.com. Notice that the password leakage preventing software component has deleted the oldest paypal.com password, as the TRUSTED_WEBSITES_PASSWORDS data structure operates, in this embodiment, as a FIFO queue for each trusted website, storing new hashes as it deletes the oldest from memory.

| trusted website domain | hashed password (base-64) | submission date |
| --- | --- | --- |
| facebook.com | rY35B19Qxfsic2RVLoaL1d/oSmlsWc+Ap0/VwX4XcHs= | Jan. 12, 2017 8:41:12 AM |
| linkedin.com | rY35B19Qxfsic2RVLoaL1d/oSmlsWc+Ap0/VwX4XcHs= | Jan. 14, 2017 6:56:09 PM |
| linkedin.com | zPI/9Rf+/j7Yu2gKJirU8bXA83d/Gx5xTBWzFYa3XgU= | Jan. 14, 2017 6:56:27 PM |
| paypal.com | S43MVs5yRv/hUha6qQBjhbafu/1QQDqbTL9W3ipED3E= | Jan. 17, 2017 8:57:40 PM |
| paypal.com | 70+cIrwNx6MRQnkWx/ypYpPbJfqCZYxxbPexX9MkY6k= | Jan. 17, 2017 8:57:53 PM |

Figure 2:
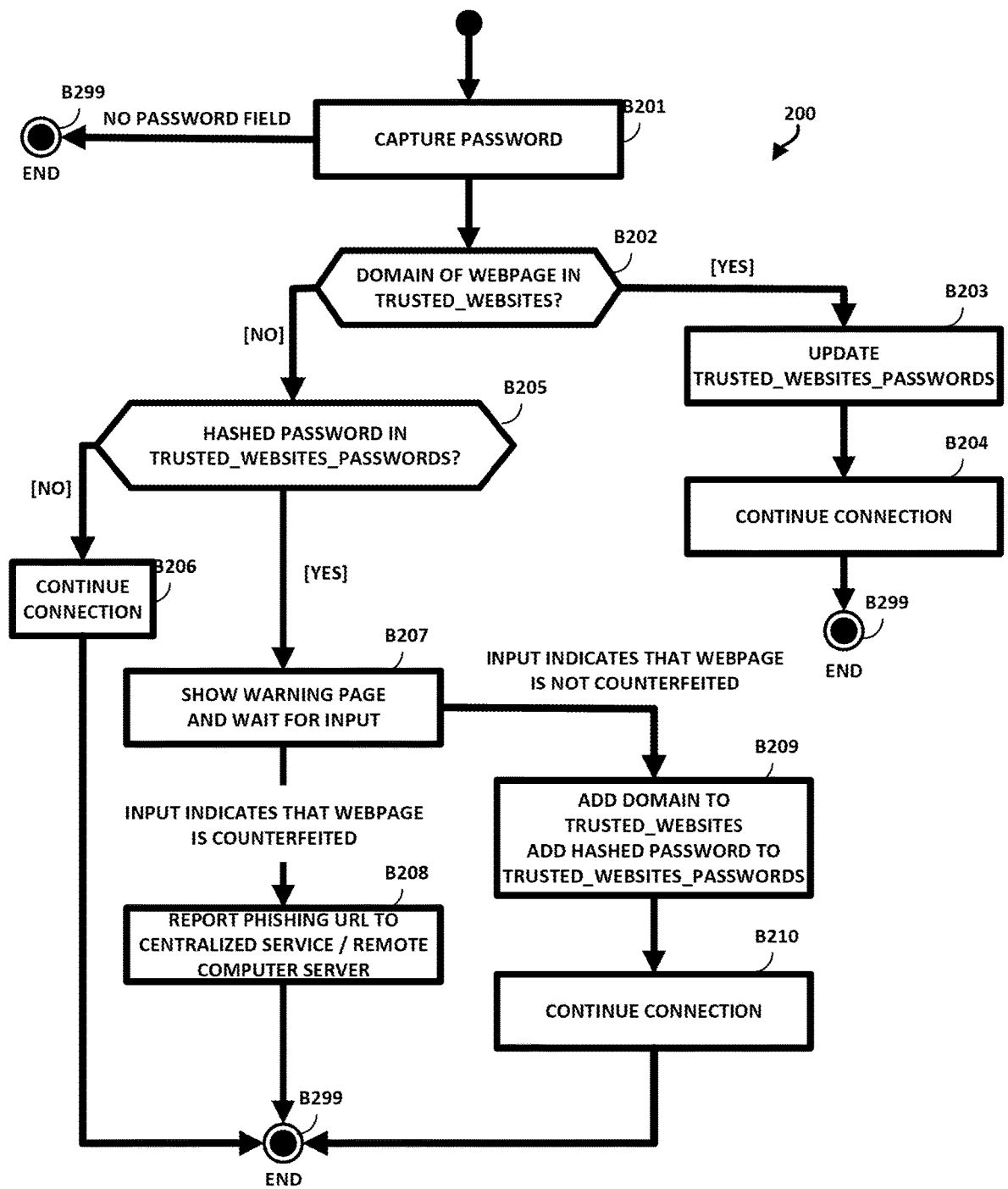
FIG. 2 is a flowchart of aspects of a computer-implemented method, according to one embodiment.
Figure 5:
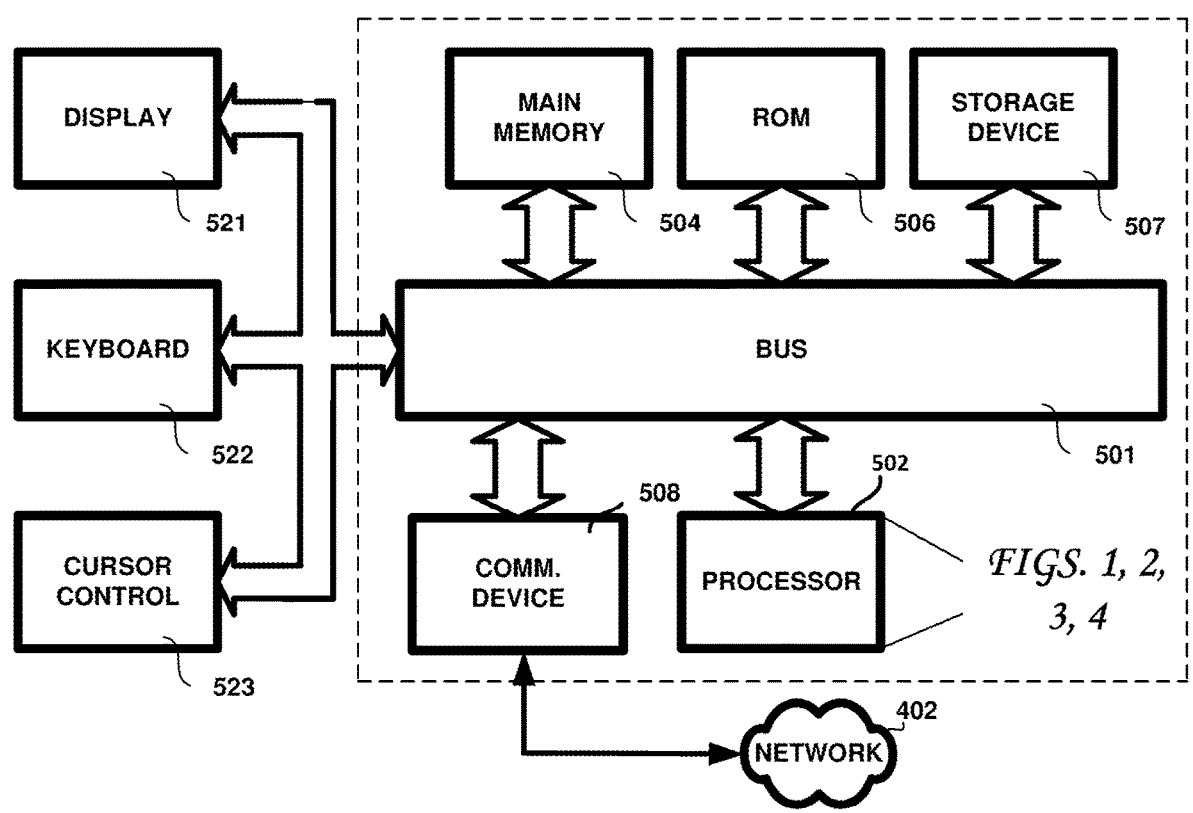
FIG. 5 is a block diagram of a computing device with which aspects of the computer-implemented methods and systems may be practiced, according to one embodiment.

One embodiment of a computer-implemented method 200 is described with reference to FIG. 2. Some or all of the blocks shown in FIG. 2 may be carried out by a computing device as shown in FIG. 5. As shown at block B201, the present password leakage preventing component may capture a password received via an input modality (e.g., keyboard, voice, etc.), as the user attempts to log onto a website. As shown at B202, the domain name of the website may then be checked against the list of trusted websites in the TRUSTED_WEBSITES list. This list may be stored and/or managed by the computing device running the password leakage preventing component according to one embodiment. At block B202, it is determined whether the domain of the website or webpage to which the user is logging onto is present in the TRUSTED_WEBSITES data structure. If the domain of the website or webpage to which the user is logging onto is indeed present in the TRUSTED_WEBSITES data structure ([Yes] branch of B202), the TRUSTED_WEBSITES_PASSWORDS data structure may be updated, as called for at B203. According to one embodiment, the password provided as input to the computing device as the user attempts to log onto the website may be hashed with a cryptographic salt input, as described earlier and stored in the TRUSTED_WEBSITES_PASSWORDS data structure as a base-64 hashed password, for example. The connection to the website may then be continued as shown at B204, whereupon the present computer-implemented method may end at B299.

If, however, the domain of the website or webpage to which the user is logging onto is not present in the TRUSTED_WEBSITES data structure ([No] branch of B202), it may be determined whether the hash of the password submitted to the website upon logon is present in the TRUSTED_WEBSITES_PASSWORDS data structure, as shown at B205. If the domain of the website is not in the TRUSTED_WEBSITES and the hash of the password captured is not present in the TRUSTED_WEBSITES_PASSWORDS data structure ([No] branch of B205), the connection may continue as shown at B206 and the computer-implemented method ends at B299, as there is no possibility of password leakage in this case.

Figure 3:
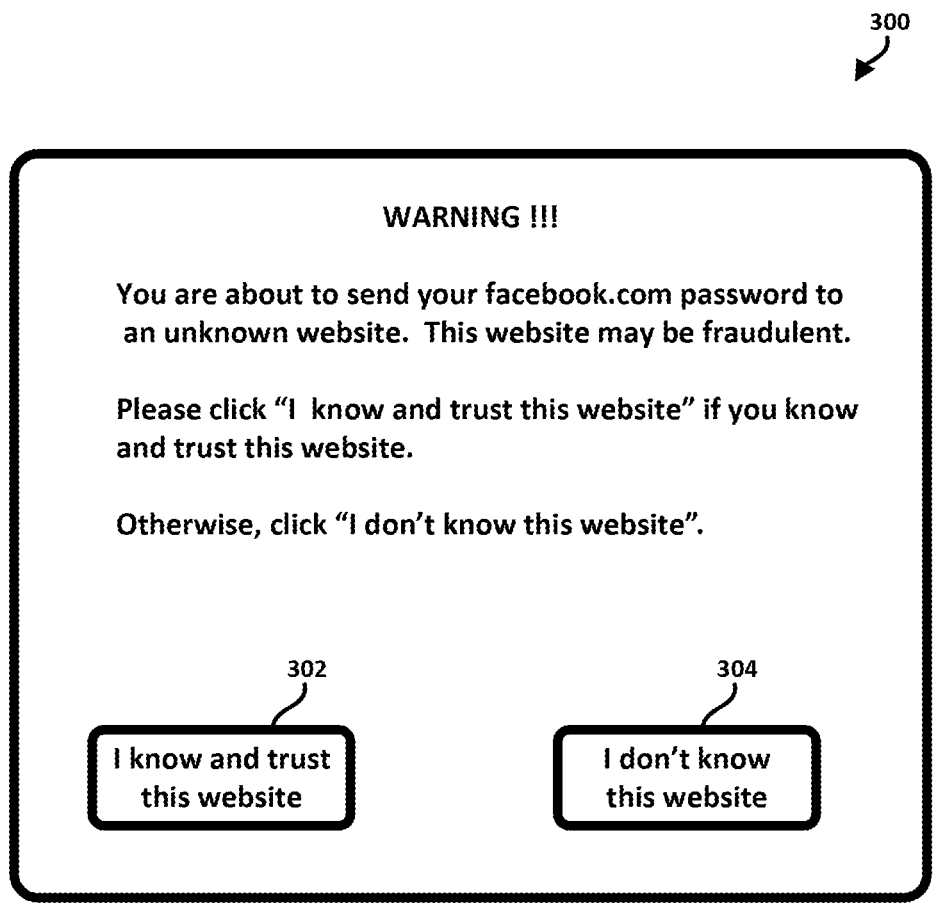
FIG. 3 is a representation of an exemplary computer-generated warning of a potential counterfeited website, according to one embodiment.

If, however, the hash of the password submitted to the website upon logon is present in the TRUSTED_WEBSITES_PASSWORDS data structure ([Yes] branch of B205), a warning may be generated, to alert the user of a potential security risk in submitting the password captured in B201 to the website to which the user is logging on. One example of such a warning is shown in FIG. 3 at 300. The warning may be configured to warn the user that he or she may be about to submit a password intended for another website to this website, which may not be the intended website (facebook.com in this example). The warning may provide the user with the opportunity to override the warning by stating that he or she knows and trusts the website as shown at 302. Alternatively, the user may elect to reconsider his or her decision to submit this password to this website (which may be counterfeited) and confirm that this website is, in fact, unknown to the user, as shown at 304. In the case in which the user clicked the button 302 indicating that the website is unknown, the password captured at B201 is not submitted to the likely fraudulent website, thereby avoiding compromising the user's facebook.com credential.

Turning back to FIG. 2, the warning page of FIG. 3 (or a functionally similar warning page, pop-up, or other visual/aural warning) is generated and the computing device configured according to the present password leakage preventing component waits for user input as shown at B207. The so-configured computing device then waits and eventually receives user input that is indicative of either that the user knows and trusts the website to which he or she is logging on or that the user does not know the website. If the computing device receives input to the effect that the user does not know or trust the website, the (most-likely) phishing website's URL may be reported to a centralized service/remote computer system coupled to the computer network (e.g., the Internet), as shown at B208. All such phishing URLs collected by the centralized service/remote computer system may be used to populate or update a blacklist of phishing URLs.

In this case, the user-entered password is not submitted to the website, thereby preventing the bad actors behind the counterfeited website from learning and profiting from the user's credentials. The present computer-implemented method may then end at B299.

After the warning is shown in B207, if the user's computing device receives input from the user that is indicative of the user knows and trusts the website to which he or she has submitted the password, block B209 may be carried out. As shown in B209, the URL of the domain of the now trusted website may be added to the TRUSTED WEB SITES. Moreover, as also shown at B209, a hash of the password may be added to the TRUSTED WEBSITE PASSWORDS data structure, in the manner discussed herein above. The user's credentials may now be safely submitted to the website and the connection may be allowed to continue as shown at B210. That is, the user-submitted login credentials may be encoded and transmitted to the website in an HTTP request using POST or GET method—according to the action and method attributes defined in the HTML form. This submission of the user's login credentials may, therefore, be safely submitted to the website with a relatively high degree of confidence that the website is most likely legitimate and will likely prove to be a trustworthy steward of submitted login information.

Figure 4:
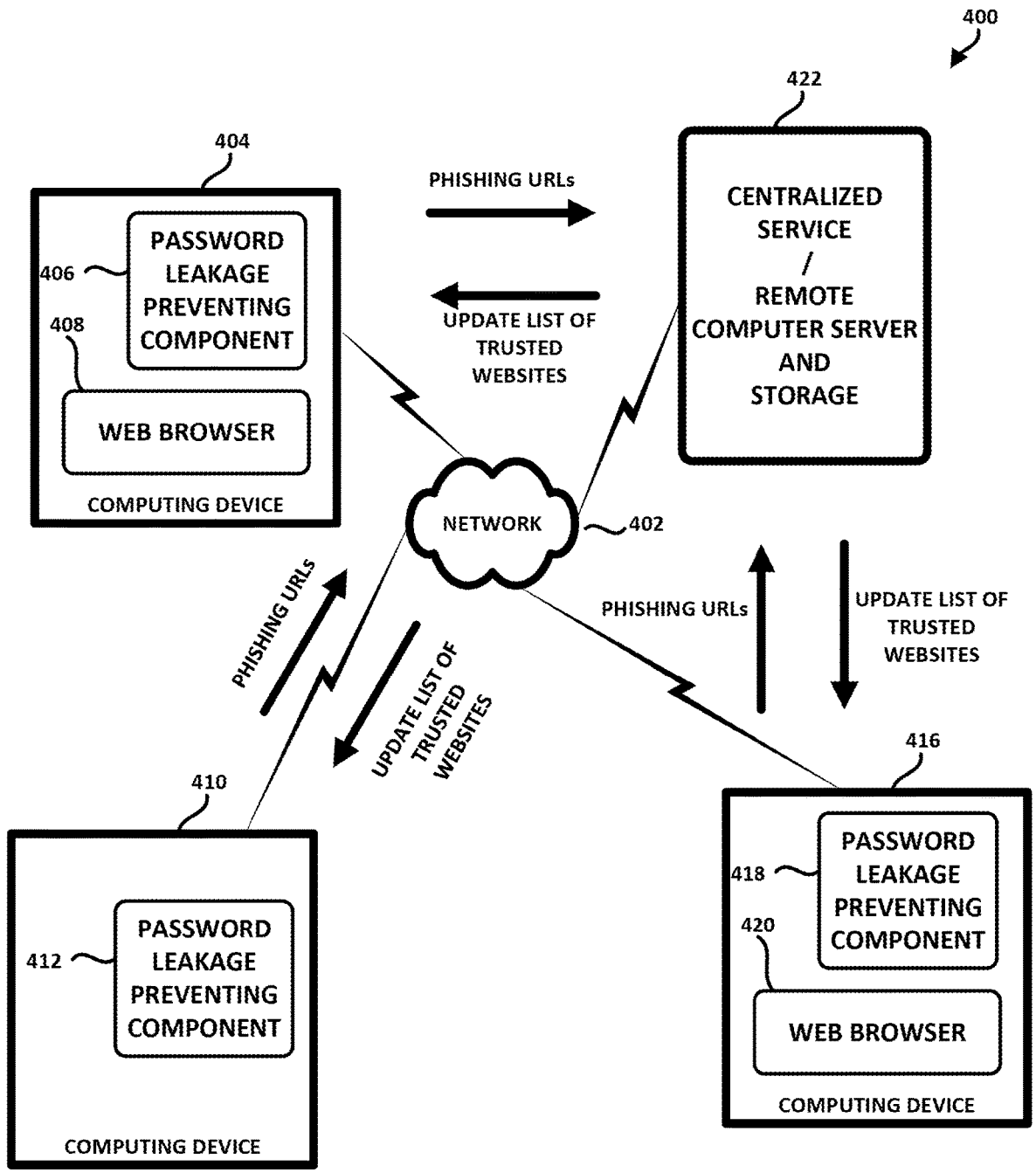
FIG. 4 is a block diagram of a computer system within which embodiments may operate.

One embodiment may be configured as a computing device such as a desktop computer, a tablet or a network-connected mobile device, as shown at 404, 410 and 416 in FIG. 4. In each of the devices 404, 410, 416, processor(s) may be controlled by stored computer-readable instructions embodying aspects of the described embodiments. One implementation of an embodiment may include a software component that is configured as a browser plug-in to add features and functionality to the web browser. In other implementations, the software component may be independent of the browser and may communicate therewith through a suitable interface. As shown in FIG. 4, each of the computing devices 404, 410, 416 may be loosely coupled, over network 202 (including, for example, the Internet), to centralized service/remote hardware computer server and storage 422. Each of the computing devices 404, 410, 416, as well as the centralized service/remote hardware computer server and storage 422, may be configured substantially as or include elements of the computing device shown and as described relative to FIG. 5, described below.

As shown in FIG. 4, the computing device 404 may include a web browser 408 with which the user may log onto and interact with, selected websites. The computing device 404 may also include a password leakage preventing component 406, which component may be configured as computer-readable instructions that are executable by the processor or processors of the computing device 404, to prevent the user's confidential credentials from being obtained by unscrupulous third parties under false pretenses. The component 406 may add functionality to the web browser 408 or may operate independently therefrom. As shown, the computing device 404 may report URLs having been determined to be phishing (fraudulent) URLs to the centralized service/remote computer server and storage 422. Such phishing URLs may be reported to the centralized service/remote computer server and storage 422, according to one embodiment, subsequent to the computing device 404 receiving input that is indicative of the user clicking button 304 in FIG. 3, indicating that he or she does not know the website to which his or her password was about to be submitted. These phishing URLs may update a blacklist of URLs that are known to be phishing URLs. The centralized service/remote computer server and storage 422, as shown in FIG. 4, may update the list of trusted websites, referred to herein above as TRUSTED_WEBSITES. The computing device 410 may also comprise a password leakage preventing component 412, configured as a standalone component. Similarly, the computing device 416 may also comprise a password leakage preventing component 418 and a web browser 420. These may be configured and operate in a similar manner as is described herein relative to computing device 404. Both may also report phishing URLs to the centralized service/remote computer server and storage 422 and receive therefrom updates to the list of trusted websites, as described herein.

The phishing URLs reported to the centralized service/remote computer server and storage 422 may update a blacklist of phishing URLs for each computing device 404, 410, 416. Alternatively, a single blacklist of suspected phishing URLs, whose constituent phishing URLs may have been contributed by one or more of the computing devices 404, 410, 416 may be shared with and/or utilized by each of the computing devices 404, 410, 416. Similarly, a plurality of lists of trusted websites sent from the centralized service/remote computer server and storage 422 to the computing devices 404, 410, 416 may be maintained, each individualized for each of the computing devices 404, 410, 416. Alternatively, a single list of trusted websites, comprising contributions from one or more of the computing devices 404, 410, 416 may be maintained by the centralized service/remote computer server and storage 422, may be pushed out or otherwise provided to each of the computing devices 404, 410, 416, thereby providing each computing device with the benefit of prior contributions from others of the computing devices 404, 410, 416 embodying a leakage preventing component according to an embodiment.

FIG. 5 illustrates a block diagram of a computing device such as client computing device, email (electronic message) server, with which embodiments may be implemented. The computing device of FIG. 5 may include a bus 501 or other communication mechanism for communicating information, and one or more processors 502 coupled with bus 501 for processing information. The computing device may further comprise a random-access memory (RAM) or other dynamic storage device 504 (referred to as main memory), coupled to bus 501 for storing information and instructions to be executed by processor(s) 502. Main memory (tangible and non-transitory, which terms, herein, exclude signals per se and waveforms) 504 also may be used for storing temporary variables or other intermediate information during execution of instructions by processor 502. The computing device of FIG. 5 may also include a read only memory (ROM) and/or other static storage device 506 coupled to bus 501 for storing static information and instructions for processor(s) 502. A data storage device 507, such as a magnetic disk and/or solid state data storage device may be coupled to bus 501 for storing information and instructions—such as would be required to carry out the functionality shown and disclosed relative to FIGS. 1-5. The computing device may also be coupled via the bus 501 to a display device 521 for displaying information to a computer user. An alphanumeric input device 522, including alphanumeric and other keys, may be coupled to bus 501 for communicating information and command selections to processor(s) 502. Another type of user input device is cursor control 523, such as a mouse, a trackball, or cursor direction keys for communicating direction information and command selections to processor(s) 502 and for controlling cursor movement on display 521. The computing device of FIG. 5 may be coupled, via a communication interface (e.g., modem, network interface card or NIC) to the network 402.

Embodiments of the present invention are related to the use of computing devices to prevent password (and/or other confidential information or credentials) leakage in phishing attacks. According to one embodiment, the methods, devices and systems described herein may be provided by one or more computing devices in response to processor(s) 502 executing sequences of instructions, embodying aspects of the computer-implemented methods shown and described herein, contained in memory 504. Such instructions may be read into memory 504 from another computer-readable medium, such as data storage device 507. Execution of the sequences of instructions contained in memory 504 causes processor(s) 502 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

Portions of the detailed description that follows describe processes and symbolic representations of operations by computing devices that may include conventional computer components, including a local processing unit, memory storage devices for the local processing unit, display devices, and input devices. Furthermore, such processes and operations may utilize conventional computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process, such as the computer-implemented methods of preventing password leakage described herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A computer-implemented method for preventing leakage of user credentials to phishing websites, comprising:
   requesting, by a web browser, a webpage of a website over a computer network;
   waiting for the requested webpage and all of the resources of the requested webpage to be loaded in the web browser;
   waiting for an event on the loaded webpage;
   identifying forms on the loaded webpage having fields associated with user credentials;
   adding, to the identified forms, at least one of:
   an input event listener to at least one of the identified fields, and a click event listener to at least one button or link belonging to the identified forms;

capturing user credentials input to at least one of the forms using the input event listener and/or the click event listener;

generating hashes of the captured user credentials by applying a key-stretching algorithm using a cryptographic salt to the captured user credentials;

storing the generated hashes in a memory, and preventing leakage of user credentials to phishing websites by comparing the generated hashes stored in the memory with entries of a list of trusted websites hashed credentials and when the generated hashes match at least one entry of the list of trusted websites hashed credentials, requesting and acting upon input indicative of whether the requested website is trusted or whether the requested website is unknown and/or untrusted, and responsive to the requested input indicating that the requested website is trusted, adding a domain of a Uniform Resource Locator (URL) of the requested website to a list of trusted websites, and allowing the user credentials to be submitted to the requested website.

2. The computer-implemented method of claim 1, wherein waiting for the requested webpage to be loaded comprises waiting for a Document Object Model (DOM) tree of the webpage of the website to reach an idle state.

3. The computer-implemented method of claim 1, wherein waiting for an event further comprises waiting for a DOM event and a DOM mutation.

4. The computer-implemented method of claim 1, wherein storing comprises storing the generated hashes in a First-In-First Out (FIFO) queue of a predetermined depth.

5. The computer-implemented method of claim 1 further comprising, for each trusted website, storing the generated hashes in a First-In-First Out (FIFO) queue that is associated with the trusted website.

6. The computer-implemented method of claim 1, further comprising:
updating a stored list of trusted websites hashed credentials upon determining that the domain of a Uniform Resource Locator (URL) of the website to which captured user credentials were input is present in a stored list of trusted websites.

7. The computer-implemented method of claim 1, further comprising, when the requested input indicates that the website is unknown and/or untrusted: sending the URL of the website to a remote computer server over a computer network, and disallowing submission of the user credentials to the website.

8. The computer-implemented method of claim 1, further comprising, when the requested input indicates that the website is trusted:
adding the domain of the URL of the website to the stored list of trusted websites,
adding the generated hashes of the captured user credentials to a stored list of trusted websites hashed credentials, and
allowing the user credentials to be submitted to the website.

9. The computer-implemented method of claim 1, further comprising receiving updates to the list of trusted websites from the remote computer server.

10. The computer-implemented method of claim 1, wherein preventing leakage of user credentials by phishing websites is performed by a web browser plug-in.

11. A computing device for preventing leakage of user credentials to phishing websites comprising:
at least one hardware processor;
at least one data storage device coupled to the at least one hardware processor;
a network interface coupled to the at least one hardware processor and to a computer network;
a plurality of processes spawned by said at least one hardware processor, the processes including processing logic for:
requesting a webpage of a website over a computer network;
waiting for the requested webpage and all of the resources of the requested webpage to be loaded in the web browser;
waiting for an event on the loaded webpage;
identifying forms on the loaded webpage having fields associated with user credentials;
adding, to the identified forms, at least one of:
an input event listener to at least one of the identified fields, and a click event listener to at least one button or link belonging to the identified forms;
capturing user credentials input to at least one of the forms using the input event listener and/or the click event listener;
generating hashes of the captured user credentials by applying a key-stretching algorithm using a cryptographic salt to the captured user credentials;
storing the generated hashes in a memory, and
preventing leakage of user credentials to phishing websites by comparing the generated hashes stored in the memory with entries of a list of trusted websites hashed credentials and when the generated hashes match at least one entry of the list of trusted websites hashed credentials, requesting and acting upon input indicative of whether the requested website is trusted or whether the requested website is unknown and/or untrusted, and
responsive to the requested input indicating that the requested website is trusted, adding a domain of a Uniform Resource Locator (URL) of the requested website to a list of trusted websites, and allowing the user credentials to be submitted to the requested website.

12. The computing device of claim 11, wherein the processing logic for waiting for the requested webpage to be loaded comprises processing logic for waiting for a Document Object Model (DOM) tree of the webpage of the website to reach an idle state.

13. The computing device of claim 11, wherein waiting for an event further comprises waiting for a DOM event and a DOM mutation.

14. The computing device of claim 11, wherein the processing logic for storing comprises the processing logic for storing the generated hashes in a First-In-First Out (FIFO) queue of a predetermined depth.

15. The computing device of claim 11, further comprising processing logic, for each trusted website, for storing the generated hashes in a First-In-First Out (FIFO) queue that is associated with the trusted website.

16. The computing device of claim 11, further comprising processing logic for:
updating a stored list of trusted websites hashed credentials upon determining that the domain of a Uniform Resource Locator (URL) of the website to which captured user credentials were input is present in a stored list of trusted websites.

17. The computing device of claim 11, further comprising processing logic for, when the requested input indicates that the website is unknown and/or untrusted: sending the URL of the website to a remote computer server over a computer network, and disallowing submission of the user credentials to the website.

18. The computing device of claim 11, further comprising processing logic for, when the requested input indicates that the website is trusted:
- adding the domain of the URL of the website to the stored list of trusted websites,
- adding the generated hashes of the captured user credentials to a stored list of trusted websites hashed credentials, and
- allowing the user credentials to be submitted to the website.

19. The computing device of claim 11, further comprising processing logic for receiving updates to the list of trusted websites from the remote computer server.

20. The computing device of claim 11, wherein the processing logic for preventing leakage of user credentials by phishing websites is configured as a web browser plug-in.

* * * * *